United States Patent
Cardin et al.

(10) Patent No.: US 9,362,727 B2
(45) Date of Patent: Jun. 7, 2016

(54) CABLE TRAY ASSEMBLY

(71) Applicant: Thomas & Betts International, Inc., Wilmington, DE (US)

(72) Inventors: Daniel D. Cardin, Quebec (CA); Daniel Lalancette, Quebec (CA); Yves Boucher, Quebec (CA)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 14/278,250

(22) Filed: May 15, 2014

(65) Prior Publication Data

US 2014/0346289 A1 Nov. 27, 2014

Related U.S. Application Data

(60) Provisional application No. 61/826,765, filed on May 23, 2013.

(51) Int. Cl.
*F16L 3/22* (2006.01)
*H02G 3/06* (2006.01)

(52) U.S. Cl.
CPC .................... *H02G 3/0608* (2013.01)

(58) Field of Classification Search
CPC ........... E04B 2/7453; E04B 2002/7481; Y10T 403/32262; Y10T 403/32418
See application file for complete search history.

(56) References Cited

U.S. PATENT DOCUMENTS

| | | | |
|---|---|---|---|
| 3,137,468 A | 6/1964 | Meinders | |
| 6,313,405 B1* | 11/2001 | Rinderer | H02G 3/0456 174/68.3 |
| 7,073,299 B1* | 7/2006 | diGirolamo et al. | 52/241 |
| 7,458,188 B2* | 12/2008 | Mears | 52/300 |
| 8,167,250 B2* | 5/2012 | White | H02G 3/0608 248/291.1 |
| 8,453,403 B2* | 6/2013 | Wheeler | 52/246 |
| 2009/0152408 A1* | 6/2009 | Pollard, Jr. | H02G 3/0456 248/58 |

FOREIGN PATENT DOCUMENTS

GB 2 367 955 4/2002

OTHER PUBLICATIONS

KRPZPH200 Vertical Elbow—Right, product cut sheet, retrieved Aug. 18, 2014, from Strader Profesionálne Elektroinštalačné Systémy: http://strader.sk/en/products/krpzph200-krpzph200_2446_cat-17.html, 1 page.

(Continued)

*Primary Examiner* — Amy Sterling
(74) *Attorney, Agent, or Firm* — Snyder, Clark, Lesch & Chung, LLP

(57) ABSTRACT

A cable tray structure includes a first section that includes a first number of sidewall members connected to each other, a second section that includes a second number of sidewall members connected to each other and one or more members coupled to the first section and the second section to provide support for cables or conduits. The first section is configured to connect with a first side rail of a third cable tray section that is to be installed in a first position, and connect with a first side rail of a fourth cable tray section that is to be installed in a second position that is angularly offset with respect to the first position. The second section is configured to connect with a second side rail of the third cable tray section, and connect with a second side rail of the fourth cable tray section.

19 Claims, 10 Drawing Sheets

(56) References Cited

OTHER PUBLICATIONS

The Snake Tray Advantage, product catalog, retrieved Aug. 18, 2014, from Snake Tray: http://www.snaketray.com/product-catalog/, 80 pages.
Cable Management—Cable Spine, product cut sheet, retrieved Aug. 18, 2014, from SpaceCo: http://www.spaceco.com/cm_details.php?prod_id=1C_id=1&id=1&item_number=CABM05BK&page_prod_id=1&page_sub_id=1, 1 page.
Cable Management—Cable Net, product cut sheet, retrieved Aug. 18, 2014, from SpaceCo: http://www.spaceco.com/cm_details.php?prod_id=1C_id=2&id=2&item_number=CABM0969BK&page_prod_id=1&page_sub_id=2, 1 page.
Cable Management—Cable Hanger, product cut sheet, retrieved Aug. 18, 2014, from SpaceCo: http://www.spaceco.com/cm_details.php?id=1∏_id=1C_id=3&item_number=CABM070BK&page_prod_id=1&page_sub_id=327, 1 page.
Cable Hose Carrier Reference Guide catalog, retrieved Aug. 18, 2014, from Gleason: http://www.gleasonreel.com/engprod/PowerTrak/Catalogs/Etrak.PDF, 32 pages.
Non-Metallic Cable/Hose Carrier catalog, retrieved Aug. 18, 2014, from Gleason: http://www.gleasonreel.com/engprod/PowerTrak/Catalogs/GRPtrak.pdf, 27 pages.
Type "G" Molded Nylon Side Link Cable/Hose Carrier catalog, retrieved Aug. 18, 2014, from Gleason: http://www.gleasonreel.com/engprod/PowerTrak/Catalogs/Gtrak.pdf, 29 pages.
PowerFlex catalog, retrieved Aug. 18, 2014, from Gleason: http://www.gleasonreel.com/engprod/PowerTrak/Catalogs/PwrFlex.pdf, 4 pages.
Protect & Control Cables or Hoses that power Moving Equipment catalog, retrieved Aug. 18, 2014, from Gleason: http://www.gleasonreel.com/engprod/PowerTrak/Catalogs/PTLine.pdf, 4 pages.
Vertical Side Tee, product cut sheet retrieved Aug. 18, 2014, from QRBiz.com: http://www.qrbiz.com/product/268676/Vertical-Side-Tee.html, 2 pages.
Shenzhen HYFT Electric Technology Co., Ltd., products list, retrieved Aug. 18, 2014, from QRBiz.com: http://www.qrbiz.com/front.do?method=companyAllProducts&companyId=102539&pager.offset=20, 3 pages.

\* cited by examiner

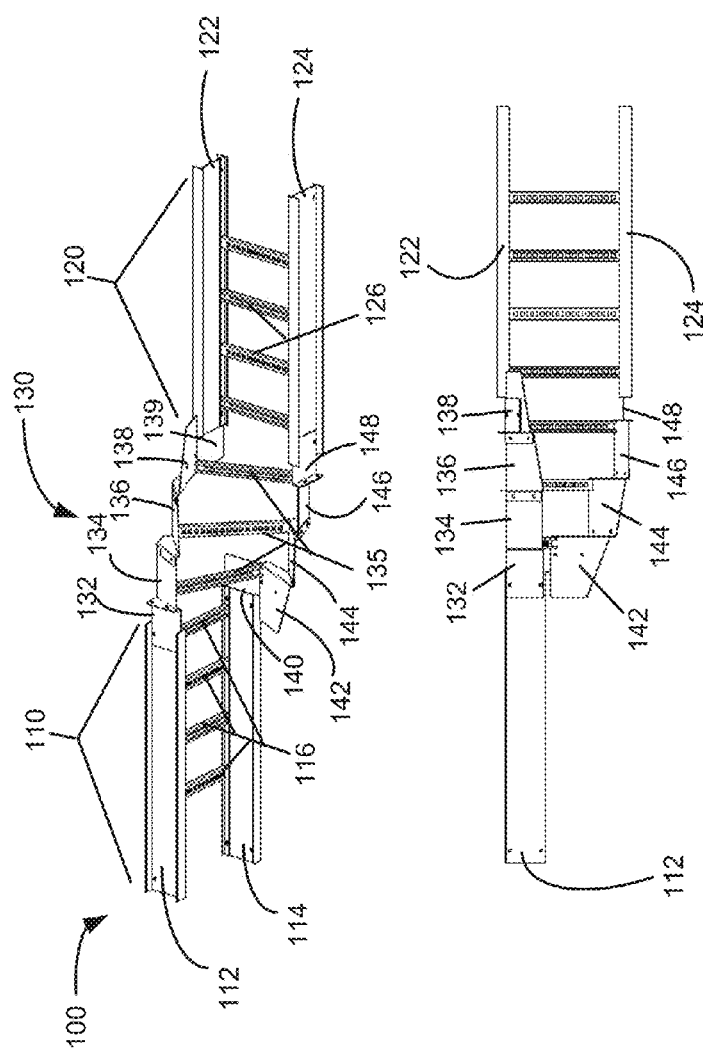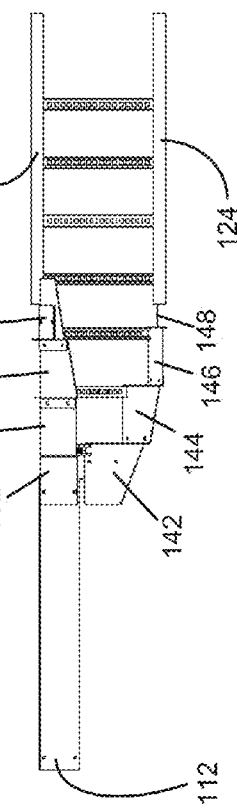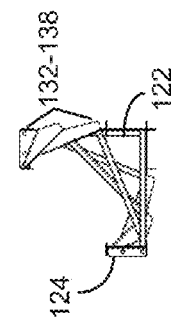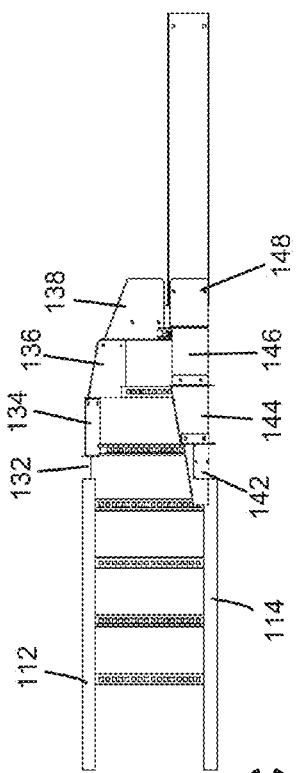

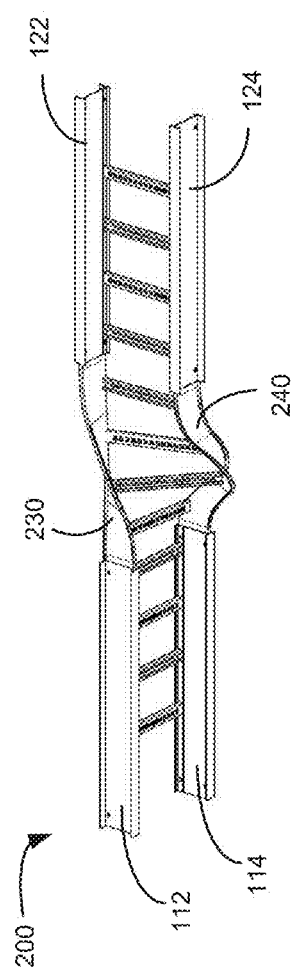
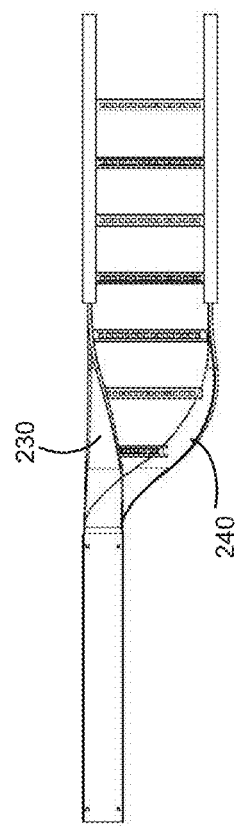
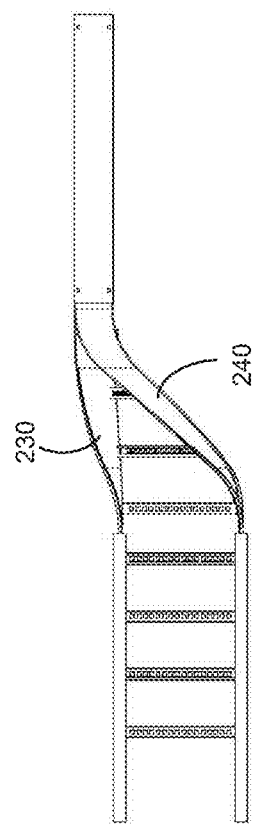
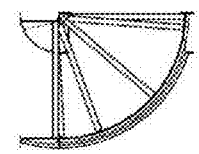
FIG. 2A
FIG. 2B
FIG. 2C
FIG. 2D

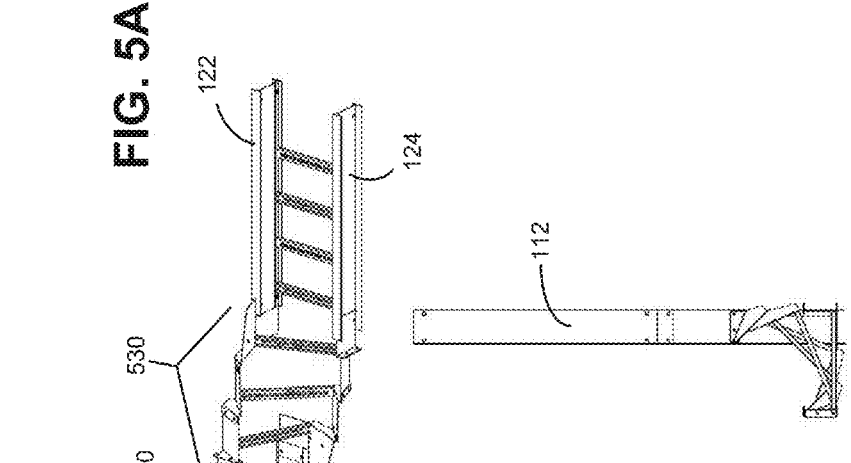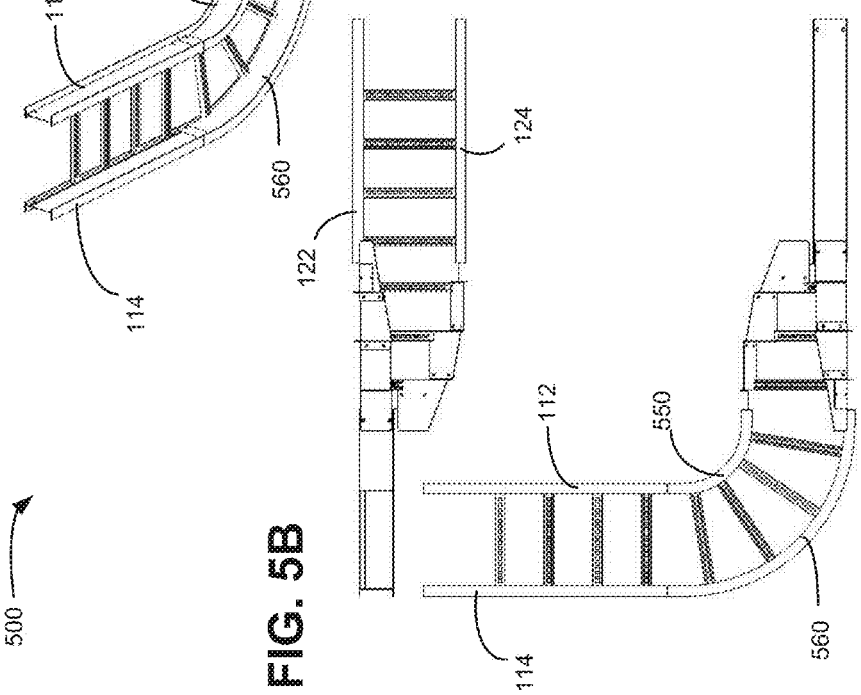

CABLE TRAY ASSEMBLY

RELATED APPLICATION

This application claims priority under 35 U.S.C. §119 based on U.S. Provisional Patent Application No. 61/826,765 filed May 23, 2013, the disclosure of which is hereby incorporated herein by reference.

BACKGROUND INFORMATION

Extensive networks of cables and conduits are often used in various types of buildings, factories, and other commercial structures for a variety of purposes. Such purposes may include providing electrical power, transmitting communication and data signals, transporting fluids, etc. Cable tray systems have been used to effectively manage the routing of such cables and conduits. Cable tray systems may take a variety of shapes and forms and may require that the cable trays be routed both horizontally with respect to the floor of a building, as well as vertically along a wall.

In conventional cable tray systems, a cable ladder structure may be used to support the cables and conduits. One drawback with conventional cable tray systems is that it is difficult to transition between a first section of cable tray that runs in one direction (e.g., horizontally with respect to the floor) and a second section that runs perpendicularly with respect to the first section (e.g., runs in a vertical orientation along a wall). Another drawback with conventional cable tray systems that include transitions, such as transitions from a horizontal run to a vertical run, is that it often becomes difficult to maintain a minimum bend radius for the cables and/or maintain electrical continuity for the cable tray system. Such problems make installation of cable tray systems time consuming and expensive.

BRIEF DESCRIPTION OF THE DRAWINGS

FIGS. 1A-1E are views of a cable tray assembly consistent with an exemplary embodiment;

FIGS. 2A-2E are views of a cable tray assembly consistent with another exemplary embodiment;

FIGS. 5A-5E are views of a cable tray assembly consistent with still another exemplary embodiment.

DETAILED DESCRIPTION OF PREFERRED EMBODIMENTS

Figure 1E:
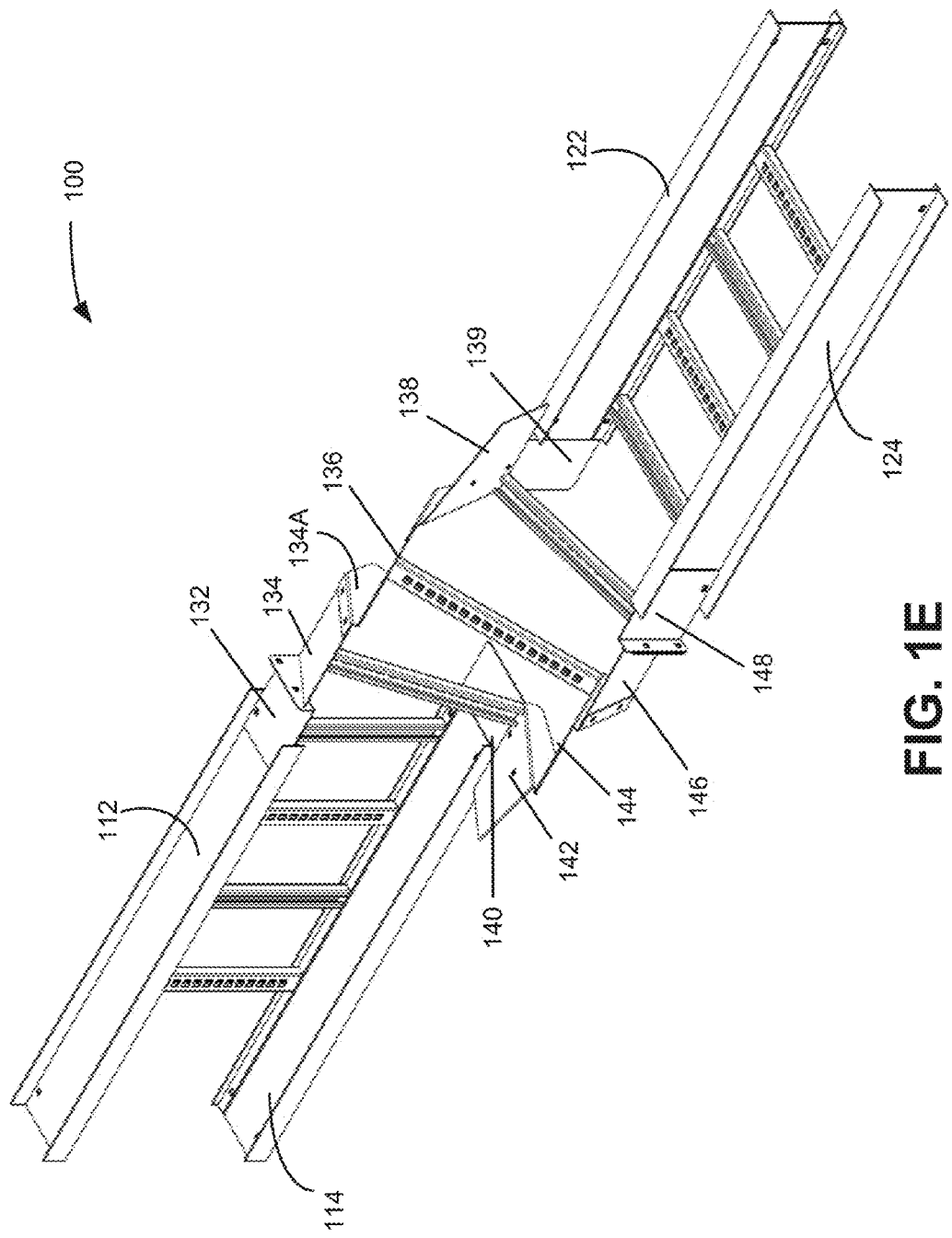

The following detailed description refers to the accompanying drawings. The same reference numbers in different drawings may identify the same or similar elements. Also, the following detailed description does not limit the invention.

Embodiments described herein provide a cable tray system/assembly that enables a cable tray to smoothly transition from a portion that is installed/runs in a first direction to another portion that is installed/runs in a different direction (e.g., perpendicular to the first direction). For example, in one implementation, a first portion of the cable tray may be installed horizontally with respect to the floor while a second portion may be installed perpendicularly or vertically with respect to the first portion (e.g., installed to run along a wall). In such an implementation, a number of side rail components may be used to connect the first portion to the second portion. The side rail components may also be welded or bolted to each other and to the first and second portions to provide electrical continuity. In other implementations, continuous sidewall members that are curved may be used to transition between the portions of the cable tray that are installed in different orientations/directions. In each case, the transition section(s) provides for a smooth transition between the cable tray sections and provides adequate bend radius for the cables, conduits or other structures supported by the cable tray system.

Cable tray systems disclosed herein may support various types of cables and conduits such as electrical cables, communications cables, various types of fluid conduits, pipes and the like. Notwithstanding such uses, the system/device of the present invention is commonly referred to as a "cable" tray even though conduits or other structures other than cables may also be supported. Accordingly, as the term is used herein and for simplicity, the term "cable" will also denote all types of cables and conduits that may be supported in a cable tray in a manner set forth and described below.

Further, although the following description and figures disclose a cable tray having a particular construction (e.g., a ladder type cable tray), other cable tray types (e.g., a solid bottom type cable tray, cable trays with I-Beam or C-shaped side rails, etc.), may also be used with the present invention. Also, cable trays described herein may be formed of a wide variety of materials well known in the cable tray art, such as aluminum, steel, and stainless steel.

FIG. 1A is an isometric view of an exemplary cable tray assembly 100 consistent with embodiments described herein. FIGS. 1B, 1C and 1D are a top view, side view and end view, respectively, of cable tray assembly 100 of FIG. 1A. Referring to FIG. 1A, cable tray assembly 100 includes portions 110 and 120 that are oriented 90° with respect to each other. As illustrated, portion 110 includes conventional cable tray components (referred to herein as cable ladder 110) that includes side rails 112 and 114 interconnected by rungs 116. Similarly, portion 120 (referred to herein as cable ladder 120) includes side rails 122 and 124 interconnected by rungs 126. Cable tray assembly 100 also includes a portion 130 that interconnects cable ladders 110 and 120 using a number of sections that are connected together and that act as a transition between cable ladders 110 and 120.

In an exemplary embodiment, portion 130 includes five relatively short side rail sections 132, 134, 136, 138 and 139 (also referred to as side rail members) formed from a metal (e.g., steel, aluminum, an alloy, etc.) that are bolted or welded together and also bolted or welded to cable ladders 110 and 120. For example, one end of side rail section 132 is bolted/welded to side rail 112 of cable ladder 110 and the opposite side of side rail section 132 is bolted/welded to side rail section 134. Side rail section 134 is bolted/welded to side rail section 136 and side rail section 136 is also bolted/welded to side rail section 138. Side rail section 138 is also bolted/welded to side rail section 139 and side rail section 139 is bolted/welded to side rail 122 of cable ladder 120.

Similarly, section 130 also includes five relatively short side rail members 140, 142, 144, 146 and 148 located on the opposite side of section 130. Side rail members 140, 142, 144, 146 and 148 are formed from a metal and are bolted or welded to each other and to side rails 114 and 124 of cable ladders 110 and 120. For example, one end of side rail section 140 is bolted/welded to side rail 114 of cable ladder 110 and one end of side rail member 148 is bolted/welded to side rail 124 of cable ladder 120. Side rail section 140 is also bolted/welded to side rail section 142, which is also bolted/welded to side rail member 144, which is bolted to side rail member 146, which is bolted to side rail member 148, as illustrated in FIGS. 1A-1C. In this manner, side rail members 132-139 and 140-148 are all bolted together and to cable ladders 110 and 120, thereby providing continuous electrical continuity between cable ladders 110 and 120.

Section 130 also includes a number of rungs 135 (e.g., three rungs 135 are shown in FIG. 1A) interconnecting side rail members 132-139 to side rail members 140-148. Together, side rails members 132-139 and 140-148, along with rungs 135 provide a gradual transition between cable ladder 110 that may be installed horizontally with respect to the floor of a building and cable ladder 120 that may be installed perpendicularly with respect to cable ladder 110 (e.g., mounted to run along a wall).

In an exemplary implementation, each of side rail sections 132, 134, 136, 138 and 139 (and side rail sections 140, 142, 144, 146 and 148) may be offset with respect to the adjoining side rail members. For example, FIG. 1E illustrates another isometric view of cable tray assembly 100. Referring to FIG. 1E, side rail member 132 is connected in parallel or along the same plane as side rail 112. Side rail member 134, however, is offset or angled from side rail member 132, as illustrated in FIG. 1E. Side rail member 134 also includes an end portion 134A that extends perpendicularly from the main portion of side rail member 134, which is bolted/welded to side rail member 136. Side rail member 136 also includes an end portion that extends perpendicularly from the main portion of side rail member 136, which is bolted/welded to side rail member 138. Side rail member 138 also includes an end portion that extends perpendicularly from the main portion of side rail member 138, which is bolted/welded to side rail member 139. One side of side rail member 139 is connected in parallel or along the same plane as side rail 122 and is bolted/welded to side rail 122.

Similarly, each of side rail sections 140, 142, 144, 146 and 148 may be offset with respect to the adjoining side rail members, as illustrated in FIG. 1E. Referring to FIG. 1E, side rail member 140 is connected in parallel or along the same plane as side rail 114 and is bolted/welded to side rail 114. Side rail member 140 also includes an end potion that extends perpendicularly from the main portion of side rail member 140, which is bolted to side rail member 142. Side rail member 142 includes an end portion that extends perpendicularly from the main portion of side rail member 142, which is bolted/welded to side rail member 144. Side rail member 144 includes an end portion that extends perpendicularly from the main portion of side rail member 144, which is bolted/welded to side rail member 146. Side rail member 146 also includes an end portion that extends perpendicularly from the main portion of side rail member 146, which is bolted/welded to side rail member 148. Side rail member 148 is also connected in parallel or along the same plane as side rail 124 and is bolted/welded to side rail 124.

As illustrated in FIG. 1E, one or more of side rail sections 132-139 (and 140-148) may include a rectangular or trapezoidal-shaped portion and a portion that extends at an angle (e.g., perpendicularly to the side rail member or at another angle with respect to the side rail member) to connect to the adjacent side rail member such that cable ladder 110 connects to cable ladder 120 via transition portion 130 in a gradual manner. The particular angles with which side rail sections 132-138 and side rail sections 142-148 are offset from one another vary based on the particular installation requirements, as well as the width and/or height of cable ladder 110 and cable ladder 120. For example, depending on the installation location of cable ladder 110 (e.g., installed along a wall), with respect to cable ladder 120 (e.g., installed parallel to the floor and offset from the wall), the angles between adjacent ones of side rail members 132-139 and 140-148 may vary from, for example, 10° to 30° (or more). In addition, the number of side rail members included on each side of section 130 (five shown in FIGS. 1A-1E) may vary from two to five or more. In each case, side rail members 132-139 and 140-148 may be offset with respect to adjacent members to gradually transition between the cable ladders 110 and 120 and to provide the desired minimum bending radius required by the cables, conduits, etc., supported by cable tray assembly 100. In addition, cable ladder 110, central portion 130 and cable ladder 120 may be connected to each other in a manner (e.g., welded, bolted, etc.) to provide electrical continuity, thereby avoiding the need to provide a bonding jumper between components of cable tray assembly 100.

In another embodiment, cable ladders 110 and 120 may be connected using other components. For example, FIG. 2A is an isometric view of an exemplary cable tray assembly 200 consistent with another embodiment. FIGS. 2B, 2C and 2D are a top view, side view and end view, respectively, of cable tray assembly 200 of FIG. 2A. Referring to FIGS. 2A-2D, cable tray assembly includes side rail members 230 and 240 that connect cable ladder 110 to cable ladder 120. For example, side rail member 230 may connect side rail 112 to side rail 122 and side rail member 240 may connect side rail 114 to side rail 124. In one implementation, side rail members 230 and 240 are made out of sheet metal and are bolted or welded to cable ladders 110 and 120 at each end. In other implementations, side rail members 230 and 240 may be made out of steel, alloys or other materials.

Figure 2E:
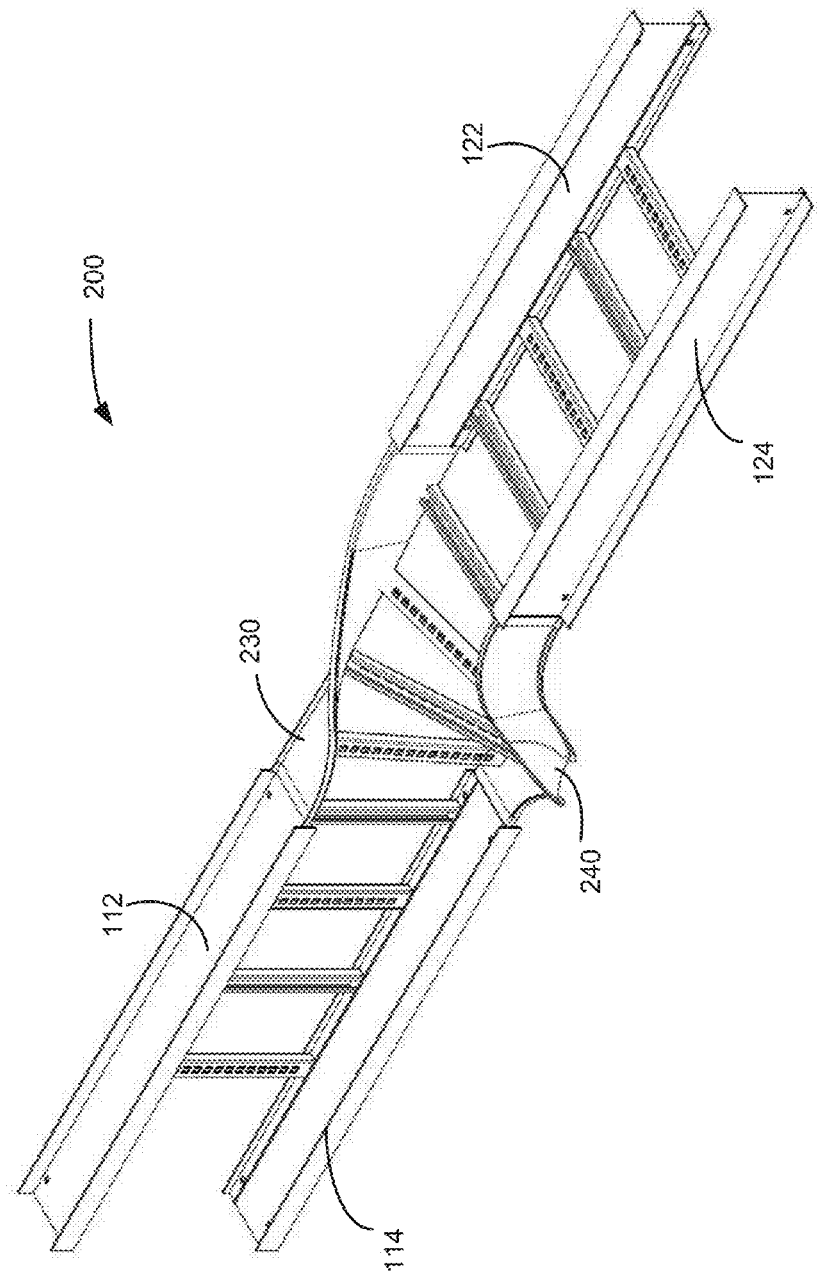

FIG. 2E provides another isometric view of cable tray assembly 200. Referring to FIG. 2E, side rail members 230 and 240 may be curved to provide a gradual transition between cable ladders 110 and 120. The particular degree of curvature of side rail members 230 and 240 depends on the particular installation requirements. For example, similar to the discussion above with respect to FIG. 1E, depending on the installation location of cable ladder 110 (e.g., installed along a wall), with respect to cable ladder 120 (e.g., installed parallel to the floor and offset from the wall), the degree of curvature of side rail members 230 and 240 may vary. In addition, in some instances, side rail members 230 and 240 may be connected to additional side rail members that are either straight or curved, to provide an overall lower degree of curvature to provide the desired minimum bending radius required by the cables, conduits, etc., supported by cable tray assembly 200. In addition, similar to cable tray assembly 100, cable ladder 110, side rail members 230 and 240 and cable ladder 120 may be connected to each other in a manner (e.g., welded, bolted, etc.) to provide electrical continuity, thereby avoiding the need to provide a bonding jumper between components of cable tray assembly 200.

Figure 3A:
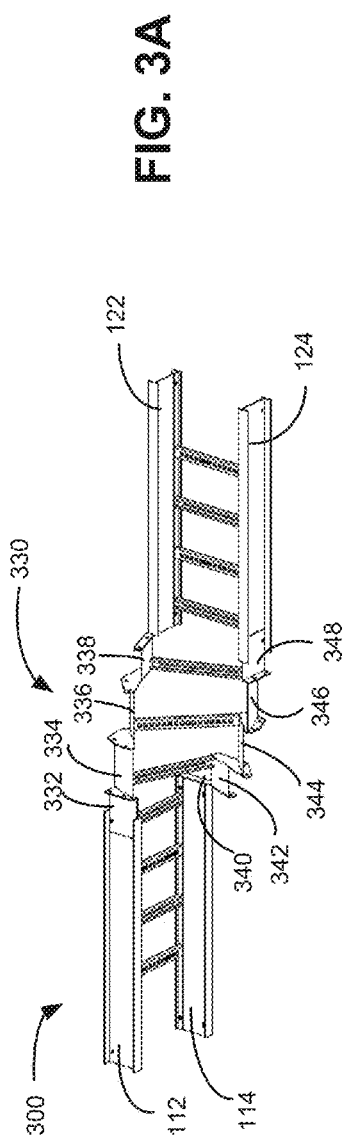
FIGS. 3A-3E are views of a cable tray assembly consistent with still another exemplary embodiment.
Figure 3B:
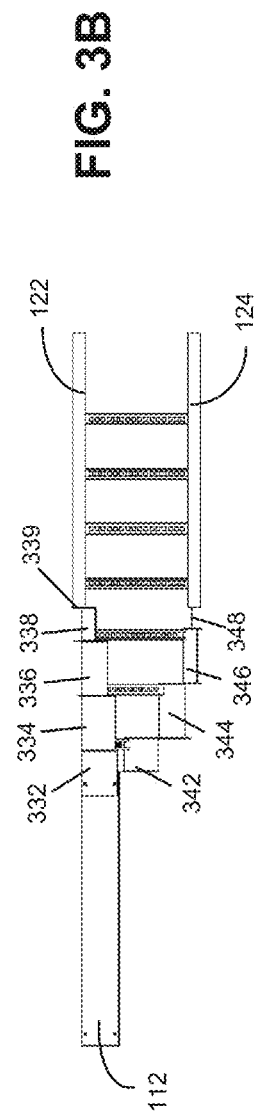
Figure 3D:
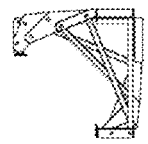
Figure 3C:
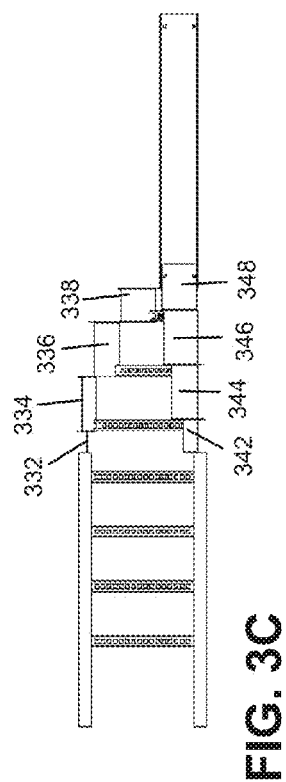

In still another embodiment, cable ladders 110 and 120 may be connected using other components. For example, FIG. 3A is an isometric view of an exemplary cable tray assembly 300 consistent with another embodiment. FIGS. 3B, 3C and 3D are a top view, side view and end view, respectively, of cable tray assembly 300 of FIG. 3A. Referring to FIGS. 3A-3D, cable tray assembly 300 includes cable ladders 110 and 120 and section 330 connecting cable ladder 110 to cable ladder 120.

In this embodiment, section 330 includes a number of side rail members 332, 334, 336, 338 and 339 located on one side of section 330 and side rail members 340, 342, 344, 346 and 348 located on the opposite side of section 330. Similar to cable tray assembly 100, side rail members 332-339 and 340-348 may each be formed from metal (e.g., steel, aluminum, an alloy, etc.) that are bolted or welded together and also bolted or welded to cable ladders 110 and 120. For example, one end of side rail section 332 is bolted/welded to side rail 112 of cable ladder 110 and the opposite side of side rail section 332 is bolted/welded to side rail section 334. Side rail section 334 is bolted/welded to side rail section 336 and side rail section 336 is also bolted/welded to side rail section 338. Side rail section 338 is bolted/welded to side rail section 339. Side rail section 339 is also bolted/welded to side rail 122 of cable ladder 120.

Similarly, side rail members 340, 342, 344, 346 and 348 are formed from a metal and are bolted or welded to each other and to side rails 114 and 124 of cable ladders 110 and 120. For example, one end of side rail section 340 is bolted/welded to side rail 114 of cable ladder 110 and one end of side rail member 348 is bolted/welded to side rail 124 of cable ladder 120. Side rail member 340 is also bolted/welded to side rail member 342, which is bolted to side rail member 344, which is bolted to side rail member 346, which is bolted to side rail member 348. Side rail member 348 is also welded/bolted to side rail 124 of cable ladder 120, as illustrated in FIGS. 3A-3C. In this manner, side rail members 332-339 and 340-348 are all bolted together and to cable ladders 110 and 120, thereby providing continuous electrical continuity between cable ladders 110 and 120.

Figure 3E:
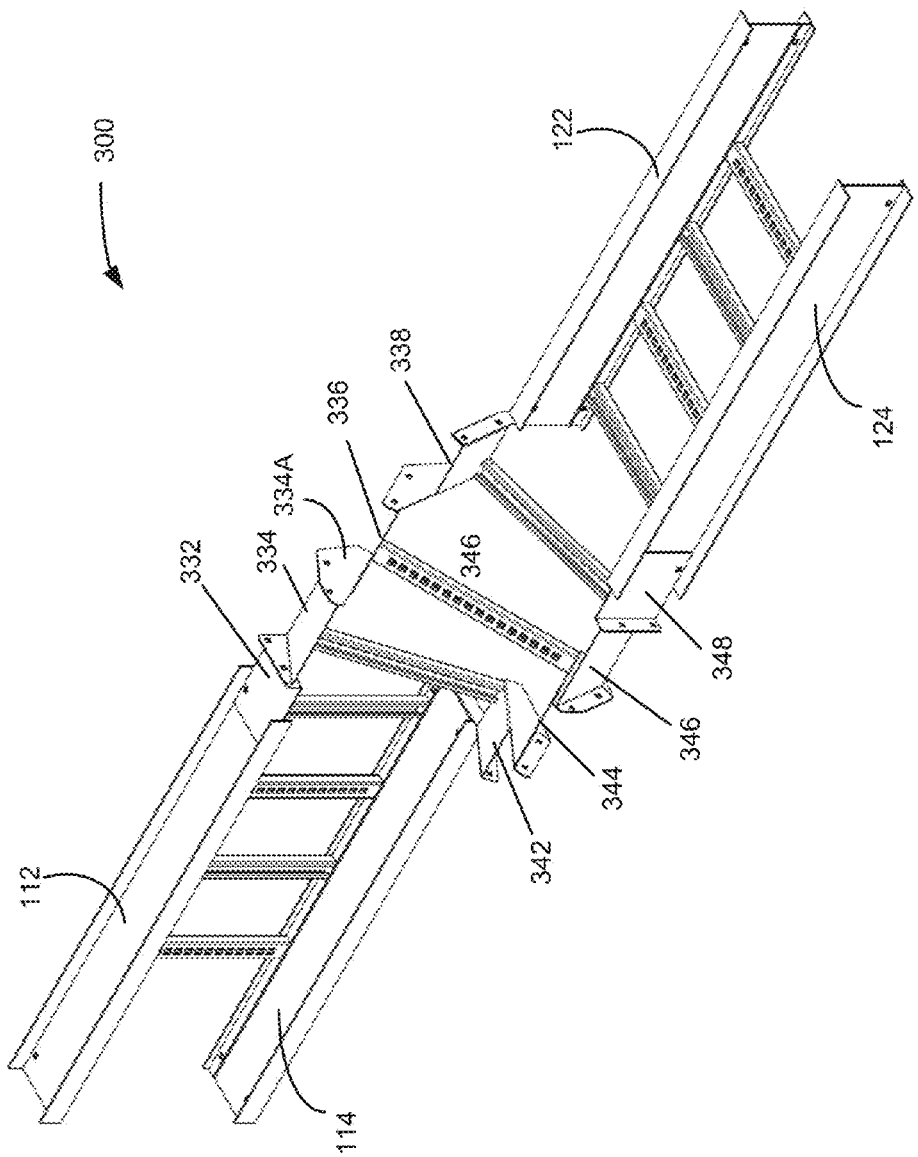

FIG. 3E illustrates another isometric view of cable tray assembly 300. Referring to FIG. 3E, side rail members 332-339 and 340-348 include rectangular or trapezoidal shaped bodies with portions extending at an angle from the main bodies. For example, side rail member 334 includes an end portion 334A that extends at an angle (e.g., perpendicularly) from the main body of side rail member 334. This end portion 334A may help add stability to portion 330 and and/or provide an easier way to bolt/weld the side rail member 334 to side rail member 336. Each of side rail members 332-339 and 340-348 includes a similar extension that is bolted/welded to the adjacent side rail member. The particular size and shape of the side rail members and extensions may be optimized based on the particular installation scenario.

For example, similar to cable tray assembly 100, side rail members 332-339 and 340-348 may be offset from adjacent members such that cable ladder 110 connects to cable ladder 120 via transition section/portion 330 in a gradual manner. Depending on the installation location of cable ladder 110 (e.g., installed along a wall), with respect to cable ladder 120 (e.g., installed parallel to the floor and offset from the wall), the angles between adjacent ones of side rail members 332-339 and 340-348 may vary from, for example, 10° to 30° (or more). In addition, the number of side rail members included on each side of section 330 (five shown in FIGS. 3A-3E) may vary from two to five or more. In each case, side rail members 332-339 and 340-348 may be offset with respect to adjacent members to gradually transition between the cable ladders 110 and 120 and to provide the desired minimum bending radius required by the cables, conduits, etc., supported by cable tray assembly 300. In addition, cable ladder 110, central section/portion 330 and cable ladder 120 may be connected to each other in a manner (e.g., welded, bolted, etc.) to provide electrical continuity, thereby avoiding the need to provide a bonding jumper between components of cable tray assembly 300.

Figure 4A:
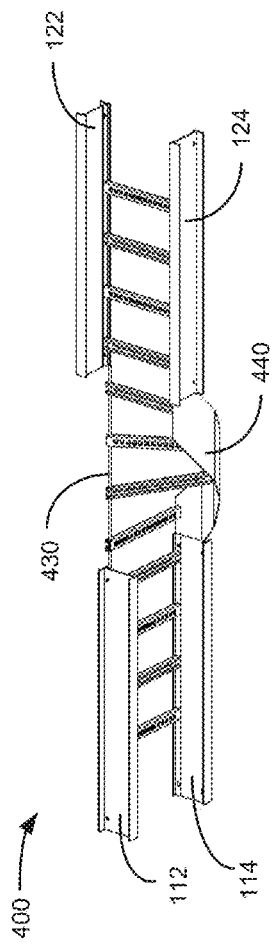
FIGS. 4A-4E are views of a cable tray assembly consistent with another exemplary embodiment.
Figure 4B:
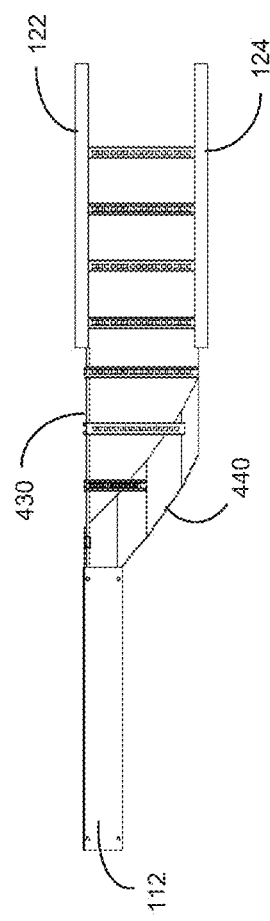
Figure 4D:
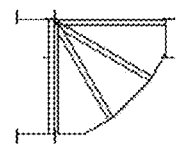
Figure 4C:
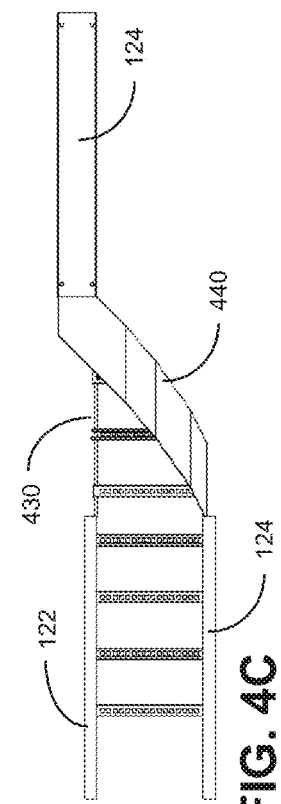

In still another embodiment, cable ladders 110 and 120 may be connected using other components. For example, FIG. 4A is an isometric view of an exemplary cable tray assembly 400 consistent with another embodiment. FIGS. 4B, 4C and 4D are a top view, side view and end view, respectively, of cable tray assembly 400 of FIG. 4A. Referring to FIGS. 4A-4D, cable tray assembly includes side rail members 430 and 440 that connect cable ladder 110 to cable ladder 120. For example, side rail member 430 may connected side rail 112 to side rail 122 and side rail member 440 may connect side rail 114 to side rail 124. In one implementation, side rail members 430 and 440 are made out of metal. For example, side rail member 430 may be made out of steel, aluminum, an alloy, etc., and side rail member 440 may be made out of sheet metal to provide good flexibility for side rail member 440.

Figure 4E:
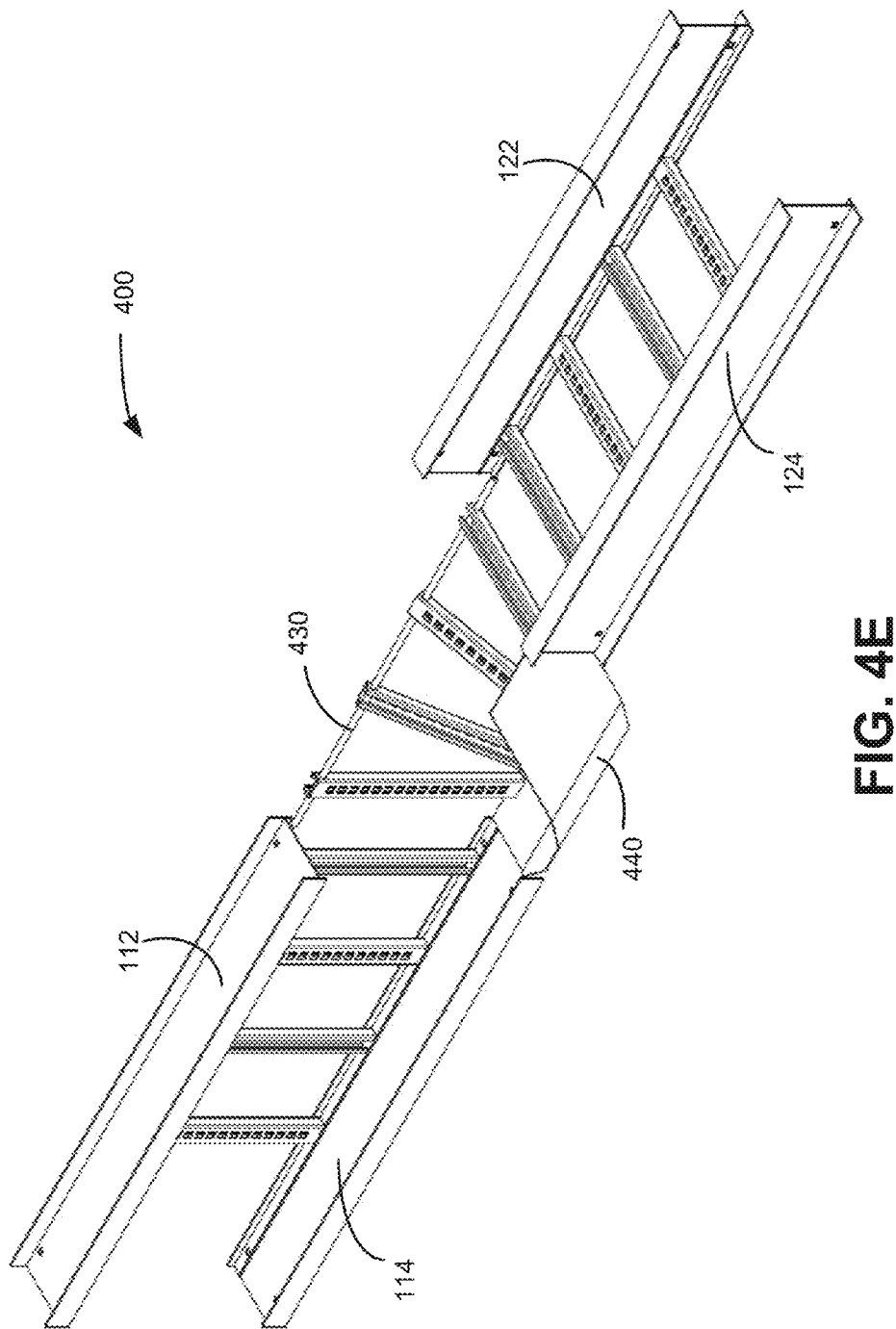

FIG. 4E provides another isometric view of cable tray assembly 400. Referring to FIG. 4E, side rail member 430 is aligned with side rails 112 and 122 and does not include any curves or bends. Side rail member 440, however, is curved to provide a gradual transition between cable ladders 110 and 120. The particular degree of curvature of side rail member 440 depends on the particular installation requirements. For example, similar to the discussion above with respect to FIG. 1E, depending on the installation location of cable ladder 110 (e.g., installed along a wall), with respect to cable ladder 120 (e.g., installed parallel to the floor and offset from the wall), the degree of curvature of side rail member 440 may vary. In addition, in some instances, side rail members 430 and 440 may be connected to additional side rail members to provide a lower degree of curvature to provide the desired minimum bending radius required by the cables, conduits, etc., supported by cable tray assembly 400. In addition, similar to cable tray assembly 100, cable ladder 110, side rail members 430 and 440 and cable ladder 120 may be connected to each other in a manner (e.g., welded, bolted, etc.) to provide electrical continuity, thereby avoiding the need to provide a bonding jumper between components of cable tray assembly 400.

In still another embodiment, cable ladders 110 and 120 may be connected using other components. For example, FIG. 5A is an isometric view of an exemplary cable tray assembly 500 consistent with another embodiment. FIGS. 5B, 5C and 5D are a top view, side view and end view, respectively, of cable tray assembly 500 of FIG. 5A. Referring to FIGS. 5A-5D, cable tray assembly 500 includes cable ladders 110 and 120, section 530 and sections 550 and 560 connecting cable ladder 110 to cable ladder 120.

In this embodiment, cable tray assembly 500 may be similar to cable tray assembly 100, with the addition of a curved section (formed from sections 550 and 560) coupled to section 530, as opposed to a straight section 110 coupled to section 130 for cable tray assembly 100. Section 530 may be the same as or similar to section 130 described above with respect to cable tray assembly 100. In other instances, section 530 may be similar to section 330 described above with respect to cable tray assembly 300. In each case, section 530 includes a number of relatively short side rail members that provide a gradual transition portion between cable ladder 120 and sections 550 and 560.

Figure 5E:
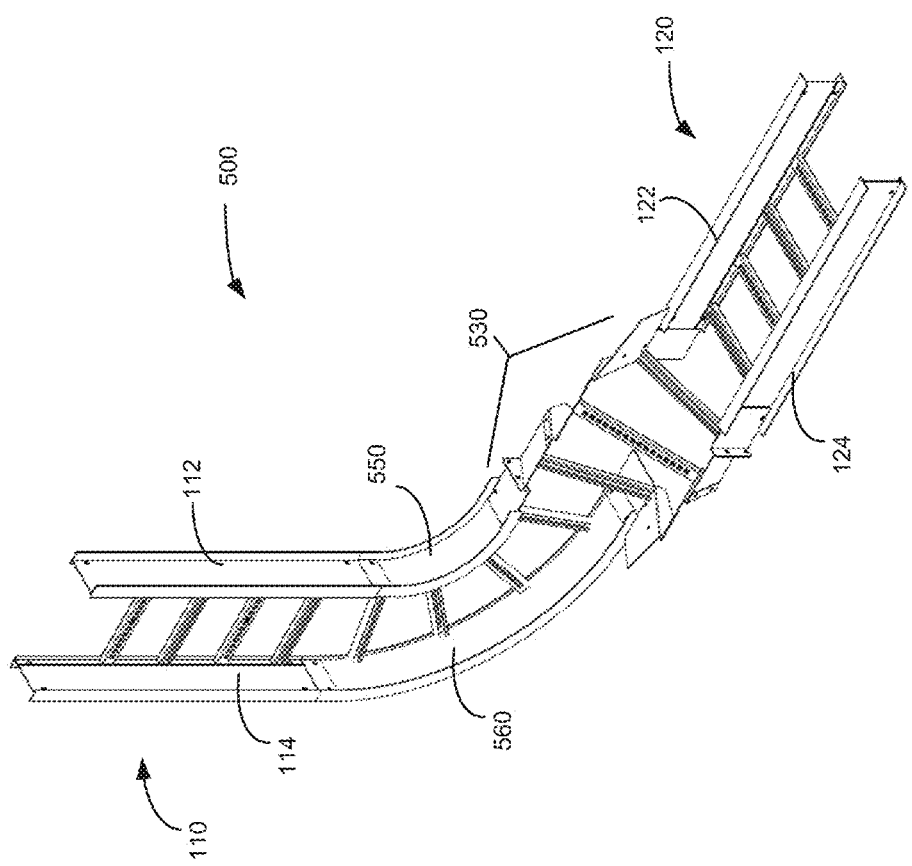

FIG. 5E illustrates another isometric view of cable tray assembly 500 of FIG. 5A. Referring to FIG. 5A, sections 550 and 560 may be made out of metal and may be curved to transition from section 530 to cable ladder 110. In this embodiment, cable ladder 110 may be run vertically with respect to cable ladder 120. For example, cable ladder 120 may be installed parallel to the floor and cable ladder 110 may be installed to run vertically with respect to the floor. In this embodiment, side rail section 550 may be curved to join one side of section 530 to side rail 112 and side rail section 560 may be curved to join the opposite side of section 530 to side rail 114. Side rail section 550 may be bolted/welded to section 530 and side rail 112. Similarly, side rail section 560 may be bolted welded to section 530 and side rail 114.

The particular degree of curvature of side rail members 550 and 560 depends on the particular installation requirements, as well as the width and/or height of cable ladder 110 and cable ladder 120. For example, similar to the discussion above with respect to FIG. 1E, depending on the installation location of cable ladder 110 (e.g., installed vertically with respect to the floor), with respect to cable ladder 120 (e.g., installed parallel to the floor and offset from the wall), the degree of curvature of side rail member 550 and 560 may vary. In addition, in some instances, side rail members 550 and 560 may be connected to additional side rail members to provide a lower degree of curvature to provide the desired minimum bending radius required by the cables, conduits, etc., supported by cable tray assembly 500. In addition, similar to cable tray assembly 100, cable ladder 110, sections 550, 560, 530 and cable ladder 120 may be connected to each other in a manner (e.g., welded, bolted, etc.) to provide electrical continuity, thereby avoiding the need to provide a bonding jumper between components of cable tray assembly 500.

Embodiments described herein provide a cable tray system/assembly that enables a cable tray to smoothly transition from a portion that is installed/runs in a first direction to another portion that is installed/runs in a different direction (e.g., perpendicular to the first direction). In each case, the transition section(s) provides for a smooth or gradual transition between the cable tray sections and provides adequate bend radius for the cables, conduits or other structures supported by the cable tray system. Further, using the transition sections or fittings described above provides a cable tray system that does not require a large number of elbow sections typically required in such installations. As a result, cable tray systems used in various installations may require less parts, which may help save money and time during installation.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, the shape and configurations of various structures has been illustrated in FIGS. 1A-5E. In other implementations, the structures may have other shapes/configurations. For example, various side rail members shown in cable tray assemblies 100-500 are shown as having substantially rectangular shapes. In other implementations, these portions or members of cable tray assemblies 100-500 may have other shapes/configurations. Further, implementations have mainly been described above in which a cable tray transition section is provided to connect from one cable tray section that is installed/runs in a first direction to another cable tray section that is installed/runs in another direction that is perpendicular to the first direction. It should be understood that in some implementations, the cable tray transition section(s) may be used to connect two cable tray sections that are not perpendicular to each other, such as situations where one cable tray section is installed/runs at, for example, 45 degree angle or any other angle between, for example, 10 degrees to 90 degrees, with respect to the other cable tray section.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A cable tray assembly configured to support at least one of cables or conduits, comprising:
   a first section comprising first and second sidewalls and a first plurality of ladder rungs connected to the first and second sidewalls, wherein the first section is configured to be installed in a first position;
   a second section comprising third and fourth sidewalls and a second plurality of ladder rungs connected to the third and fourth sidewalls, wherein the second section is configured to be installed in a second position that is perpendicular with respect to the first position and wherein the first plurality of ladder rungs are oriented perpendicularly with respect to the second plurality of ladder rungs, and wherein the at least one of cables or conduits to be supported by the cable tray assembly in the first and second sections run in a same direction; and
   a third section connected to the first and second sections, wherein the third section includes:
      a first plurality of sidewall members connected to each other, and
      a second plurality of sidewall members connected to each other,
   wherein the first plurality of sidewall members connects the first sidewall of the first section to the third sidewall of the second section, and at least some of the first plurality of sidewall members are angularly offset with respect to each other, and
   wherein the second plurality of sidewall members connects the second sidewall of the first section to the fourth sidewall of the second section, at least some of the second plurality of members are angularly offset with respect to each other.

2. The cable tray assembly of claim 1, wherein the first plurality of sidewall members are bolted or welded to an adjacent one of the first plurality of sidewall members, and wherein the second plurality of sidewall members are bolted or welded to an adjacent one of the second plurality of sidewall members, and
   wherein each of the first plurality of sidewall members is angularly offset with respect to an adjacent one of the first plurality of sidewall members, and
   wherein each of the second plurality of sidewall members is angularly offset with respect to an adjacent one of the second plurality of sidewall members.

3. The cable tray assembly of claim 1, wherein the first plurality of sidewall members and the second plurality of sidewall members provide a transition between the first and second sections based on a bend radius associated with cables or conduits that are to be supported by the cable tray assembly.

4. The cable tray assembly of claim 1, wherein a first one of the first plurality of sidewall members includes a main portion and an extension portion, wherein the extension portion extends at an angle from the main portion and is connected to a second one of the first plurality of sidewall members.

5. The cable tray assembly of claim 4, wherein a first one of the second plurality of sidewall members includes a main portion and an extension portion, wherein the extension portion extends perpendicularly from the main portion and is connected to a second one of the second plurality of sidewall members.

6. The cable tray assembly of claim 1, wherein the first section, second section and third section are connected together and provide electrical continuity for the cable tray assembly.

7. A cable tray structure, comprising:
   a first plurality of sidewall members connected to each other, the first plurality of sidewall members forming a first section of the cable tray structure;
   a second plurality of sidewall members connected to each other, the second plurality of sidewall members forming a second section of the cable tray structure; and
   a first plurality of ladder rungs coupled to the first section and the second section, the first plurality of ladder rungs configured to provide support for cables or conduits,
   wherein the first section is configured to:
      connect with a first side rail of a third cable tray section that is to be installed in a first position, wherein the third cable tray section includes a second plurality of ladder rungs, and
      connect with a first side rail of a fourth cable tray section that is to be installed in a second position that is perpendicular with respect to the first position, wherein the fourth cable tray section includes a third plurality of ladder rungs, and
   wherein the second section is configured to:
      connect with a second side rail of the third cable tray section, and
      connect with a second side rail of the fourth cable tray section,
   wherein at least some of the first plurality of sidewall members are angularly offset with respect to each other,
   wherein at least some of the second plurality of sidewall members are angularly offset with respect to each other, and
   wherein the second plurality of ladder rungs are oriented perpendicularly to the third plurality of ladder rungs and the second plurality of ladder rungs run in a same direction as the third plurality of ladder rungs.

8. The cable tray structure of claim 7, wherein the first plurality of sidewall members are bolted or welded to an adjacent one of the first plurality of sidewall members, and wherein the second plurality of sidewall members are bolted or welded to an adjacent one of the second plurality of sidewall members.

9. The cable tray structure of claim 7, wherein the first plurality of sidewall members and the second plurality of sidewall members provide an angled transition between the third cable tray section and the fourth cable tray section.

10. The cable tray structure of claim 7, wherein at least a first one of the first plurality of sidewall members includes a main portion and an extension portion, wherein the extension portion extends perpendicularly from the main portion and is connected to an adjacent one of the first plurality of sidewall members.

11. The cable tray structure of claim 10, wherein at least a first one of the second plurality of sidewall members includes a main portion and an extension portion, wherein the extension portion extends at an angle from the main portion and is connected to an adjacent one of the second plurality of sidewall members.

12. The cable tray structure of claim 7, wherein the first section, second section and the first plurality of ladder rungs provide electrical continuity for the cable tray structure.

13. The cable tray assembly of claim 1, wherein the first position is substantially parallel to a floor of a building and the second position is parallel to a wall of the building.

14. The cable tray assembly of claim 1, wherein the third section further comprises a third plurality of ladder rungs, each of the third plurality of ladder rungs being coupled to one of the first plurality of sidewall members and one of the second plurality of sidewall members, and wherein each of the third plurality of ladder rungs is configured to provide support for the at least one of cables or conduits.

15. The cable tray assembly of claim 1, wherein multiple ones of the first plurality of sidewall members include a main portion and an end portion that extends perpendicularly from the main portion, and wherein the end portion is coupled to an adjacent one of the first plurality of sidewall members.

16. The cable tray structure of claim 7, further comprising:
   the third cable tray section; and
   the fourth cable tray section.

17. The cable tray structure of claim 16, wherein the fourth cable tray section is configured to be installed perpendicularly with respect to the third cable tray section.

18. The cable tray structure of claim 16, wherein the first position is substantially parallel to a floor of a building and the second position is parallel to a wall of the building.

19. The cable tray structure of claim 7, wherein at least some of the first plurality of sidewall members include a main portion and an extension portion that extends perpendicularly from the main portion, and wherein the extension portion is coupled to a main portion of an adjacent one of the first plurality of sidewall members.

* * * * *